Patented Oct. 31, 1961

3,006,958
PRODUCTION OF CYCLOHEXANONE
Guenter Poehler, Ludwigshafen (Rhine), Germany, assignor to Badische Anilin- & Soda-Fabrik Aktiengesellschaft, Ludwigshafen (Rhine), Germany
No Drawing. Filed Nov. 18, 1958, Ser. No. 774,603
4 Claims. (Cl. 260—586)

This invention relates to a process for the production of cyclohexanone by treating aniline or nitrobenzene with water and hydrogen in the presence of a catalyst.

It is known that in the reaction of amines, for example aniline, with water in the presence of hydrogenation catalysts, the proportion of cyclohexanone in the product can be increased by carrying out the treatment under dehydrogenating conditions in the absence of hydrogen. Undesirable nitrogenous by-products, however, are formed in considerable amounts and these diminish the yield with reference to amine on the one hand and render very difficult the working up of the product on the other hand.

I have now found that high yields of cyclohexanone in addition to cyclohexanol are obtained when the condensed reaction products containing cyclohexanol obtained by treating aniline or nitrobenzene with water with supply of hydrogen in the presence of hydrogenating catalysts, after separating the gaseous constituents and the ammoniacal water, are dehydrogenated in a manner known per se without the supply of hydrogen in the presence of the usual dehydrogenation catalysts of metals of the groups IB, IIB or VIIIA of the periodic system, but in the presence of steam and in two or more stages at increasing temperature. The reaction product is condensed after each stage, freed from the gaseous constituents and the condensed ammoniacal water, and supplied to the next stage at a higher temperature than that of the preceding stage.

By a single passage in the first process stage, a reaction product is obtained which consists of cyclohexanol, a small amount of cyclohexanone and to the extent of about one quarter of amines. From this mixture, the cyclohexanol can be separated by distillation only with very great difficulty. Even by a multiple further reaction with ammonia-free hydrogen and steam it is not possible to react completely the amines contained in the reaction mixture. By the process according to this invention, the reaction product enriched with amines occurring in the first stage, however, after separation of the ammoniacal water and the gaseous constituents, is directly subjected to a further dehydrogenating treatment in the presence of steam in two or more stages at increasing temperature. Surprisingly it has been found that this reaction product is free from amines or contains only quite small proportions of the same, which do not disturb the distillative working up. The essential feature of the invention is the separation of the ammoniacal water and the gaseous constituents prior to the dehydrogenation and, when the dehydrogenation is carried out in a plurality of stages, during the dehydrogenation. By this measure, the retrogressive reaction of ammonia with the cyclohexanol is suppressed. By the increase in temperature, the hydrolysis of the amines still contained in the reaction mixture by the steam is promoted to such an extent that under the dehydrogenating conditions cyclohexanone is formed at once which in contrast to cyclohexanol can no longer react retrogressively with the ammonia set free. The reaction product, free from amines can be separated without difficulty because the troublesome azomethine formation from cyclohexanone and amines is now excluded.

It is especially advantageous to subdivide the dehydrogenating treatment into two or more stages, the reaction product being condensed after each stage, freed from the gaseous constituents and the condensed ammoniacal water and introduced into the next stage. The hydrogenating pretreatment may also be carried out in a plurality of stages, and it is similarly preferable to condense the reaction product after each stage and to free it from the gaseous constituents and the condensed ammoniacal water.

It is a further advantage of the process that it is possible to start directly from nitrobenzene.

The hydrogenation catalysts are those conventionally employed in hydrogenation processes, for example the heavy metals of the 5th to 8th groups and/or of the 1st group of the periodic system, as well as their oxides and sulfides. Suitable metals are nickel, cobalt and noble metals, such as platinum, palladium, rhodium and iridium, the preferred one being nickel. The catalysts can be used as such or after application to carriers, for example pumice, silica, bleaching earths, synthetic silicates, active aluminas or bauxite in the form of pills, granulated or in powder form. These catalysts are used advantageously with contents of 3 to 20, preferably 5 to 15 percent by weight of active components, e.g. nickel.

The individual stages of the reaction, and indeed the hydrogenating stages as well as the dehydrogenation stages may for example be carried out in vertical reaction vessels in which the catalyst is arranged in a fixed bed. In the hydrogenating pretreatment, the aniline together with water and hydrogen is led in the gaseous or liquid state at elevated temperature, for example at 150° to 300° C., and if necessary under pressure, e.g. up to 50 atmospheres, through the catalyst chamber. The hydrogen may be led in cocurrent or in countercurrent.

The aniline may also be led with the catalyst through a heated vertical reaction zone. The process proceeds exothermically in the hydrogenating stage. In order to suppress the retrogressive reaction, large amounts of heat must be withdrawn from the reaction chamber. A large excess of hydrogen, for example 100 times the amount, is therefore often used in order to withdraw the heat from the reaction chamber with the hydrogen. Since the conduction of large amounts of hydrogen in circulation is uneconomical, it has proved to be preferable to carry out the reaction in a tube furnace, the catalyst being situated inside the tubes or outside the same. The heat is withdrawn with the aid of cooling media led through the intermediate spaces free from catalyst, for example diphenyl or water. As the cooling medium there may also be used water under pressure which is led through a cooling system, for example a spiral tube, present in the reaction chamber. With the aid of this reaction vessel it is possible to manage with a fraction, for example one fifth of the large amount of hydrogen. By this measure, an increase in output is achieved with reference to the catalyst volume.

Furthermore, it is possible to introduce the aniline vapor, hydrogen and steam into the lower part of a vertical reaction vessel, which may be provided with a cooling system, in such a way that the pulverulent, granular or pilled catalyst is kept in fluidized motion. The catalyst may be carried away with the vapors and/or removed from the lower denser fluidized layer in the reaction vessel. The hydrogen may also be introduced at different places into the fluidized bed. The temperature of the hydrogen is preferably kept below the reaction temperature so that it acts as a cooling medium.

The product coming from the first reaction vessel is led through a cooler and condensed. The gaseous constituents, hydrogen and ammonia are separated in a separating vessel and the hydrogen returned to the first stage of the process through a gas washer. The liquid constitutents form two layers in the separator. The aqueous layer is run off and the oily layer is heated and treated under dehydrogenating conditions with steam in a second reaction vessel, this time without the supply of hydrogen, at temperatures of 150° to 300° C., preferably at 200° to 280° C. The dehydrogenation may be carried out at normal or slightly increased pressure, e.g. 1 to 50 atmospheres. It is advantageous to carry out the dehydrogenation at normal pressure.

The catalysts used in the dehydrogenation step of the process are those conventionally used for dehydrogenation purposes, such as, for example, the heavy metals of the groups IB, IIB, VIIIA of the periodic system. Suitable catalysts of the said type are nickel, copper, and zinc. These can be used either in their metal form or in the form of their oxides, advantageously applied to carrier substances in an amount of from 3 to 20, preferably from 5 to 15, percent by weight. Suitable substances are silica, pumice and synthetic or natural silicates. The said catalysts may be arranged in a fixed bed. In the practice of my invention I prefer copper as a catalyst. The said catalyst may be used by itself or in combination with chromium oxide up to the stoichiometrical value, preferably with from 0.5 to 3.0% by weight of chromium oxide, percentage with reference to the copper.

The mixture coming from the reaction vessel is again condensed and freed from ammonia by first separating the gaseous constituents and then the aqueous ammoniacal layer. The oily layer is treated if necessary in a further reaction stage with steam at a temperature of 240° to 380° C. under dehydrogenating conditions, the reaction product obtained freed in the same way from gaseous and aqueous constituents and then distilled.

Like the dehydrogenating treatment, the previous hydrogenating treatment can also be carried out in two or more stages. The form in which the catalyst is used may be the same in all stages or may be different in some or all of the stages. Thus for example a rigidly arranged catalyst may be used in one or more stages, while in the remaining stage or all the remaining stages a moved catalyst is used.

It is advantageous to choose a temperature which increases from stage to stage. In the last stage or, when there are more than three stages, for example also in the last two stages, a temperature of at least 240° C. should prevail.

In each process stage there is used one half to one and one half times the weight of water with reference to the initial material. The amount of water used in all should amount to twice to four times, advantageously twice to three or three and a half times the weight of the initial material. It may be distributed in equal or unequal portions in the individual stages.

By the use of smaller amounts of water and by the ready working up of the reaction product practically free from amines, the expenditure of energy is very small.

The following example will further illustrate this invention but the invention is not restricted to this example.

*Example*

Aniline with the same weight of steam is led togther with hydrogen at 200° C. over a catalyst mass of pumice with 6% of nickel. The reaction product is led through a condenser into a separator in which at 70° C. the gaseous constituents escape. The hydrogen is separated therefrom through a washing with water and led back into the first reactor. The liquid fraction of the reaction product is separated into an aqueous ammoniacal layer and an oily layer. The aqueous ammoniacal layer is separated and the oily layer is heated with the same weight of steam and led over copper which is applied to silica at 240° C. in a second reactor.

The reaction product is again led through a condenser and again freed in a separator from the gaseous constituents and separated into two layers. The aqueous layer is branched off and the oily layer heated with the same weight of steam and led at 270° C. over the same catalyst in a third reactor.

The reaction product flowing away from the third reactor is again separated in the same way and the oily layer therefrom separated in an ordinary distillation plant. The amounts of water used in all is freed from the organic products entrained from the process, by steam treatment. From 1000 kilograms of aniline there are obtained 760 kilograms of cyclohexanone, 185 kilograms of cyclohexanol and about 42 kilograms of residue.

In the first stage from 1000 kilograms of aniline, there are obtained by treatment with steam and hydrogen 690 kilograms of cyclohexanol and 350 kilograms of cyclohexylamine, dicyclohexylamine and by-products.

If this reaction product is dehydrogenated in the second process stage in the same way without the use of steam, a reaction mixture is obtained which contains 525 kilograms of cyclohexanone, whereas the 350 kilograms of amines contained in the reaction mixture of the first stage remain unchanged. This reaction mixture is practically inseparable by distillation because equivalent amounts of amines condense with cyclohexanone to form azomethines.

What I claim is:

1. A process for the production of cyclohexanone which comprises reacting a compound selected from the group consisting of aniline and nitrobenzene with water and hydrogen in the presence of a hydrogenation catalyst at a temperature of from about 150° C. to about 300° C., condensing the reaction product which contains cyclohexanol, stripping off gaseous constituents and ammoniacal water, dehydrogenating the reaction product with water in the presence of a dehydrogenation catalyst at elevated temperatures using a multi-stage dehydrogenation procedure wherein the temperature in the first stage is between 150° and 300° C., wherein the temperature is higher in each successive stage, and wherein the temperature in the second and following stages is between about 240° and 380° C., the said reaction product being condensed between each successive dehydrogenation stage in order to strip it of gaseous constituents and ammoniacal water.

2. A process as set forth in claim 1 wherein the dehydrogenation is carried out in two stages and wherein the temperature in the first stage is between about 150° and about 300° C., and wherein the temperature in the second stage is between about 240° and 380° C.

3. A process as in claim 1 wherein the dehydrogenation of the reaction product is carried out in from two to six stages.

4. A process as in claim 1 wherein the temperature in the first dehydrogenation stage is 200° to 280° C.

References Cited in the file of this patent

UNITED STATES PATENTS

| 1,892,011 | Sandkuhl | Dec. 27, 1932 |
| 2,481,922 | Hager | Sept. 13, 1949 |

OTHER REFERENCES

Ser. No. 309,303, Schmidt et al. (A.P.C.), published Apr. 20, 1943 (abandoned).